(12) United States Patent
Pan et al.

(10) Patent No.: US 6,240,220 B1
(45) Date of Patent: May 29, 2001

(54) TUNABLE OPTICAL FIBER PACKAGE

(75) Inventors: Jing-Jong Pan, Milpitas; Feng-Qing Zhou, San Jose, both of CA (US)

(73) Assignee: E-Tek Dynamics, Inc., San Jose, CA (US)

( * ) Notice: Subject to any disclaimer, the term of this patent is extended or adjusted under 35 U.S.C. 154(b) by 0 days.

(21) Appl. No.: 09/124,102

(22) Filed: Jul. 29, 1998

(51) Int. Cl.[7] .................................................. G02B 6/00
(52) U.S. Cl. .................................................. 385/13; 385/12
(58) Field of Search .................................. 385/10, 13, 24, 385/37; 359/128, 130

(56) References Cited

U.S. PATENT DOCUMENTS

| | | |
|---|---|---|
| 3,387,531 | 6/1968 | Hess ............................................ 88/14 |
| 4,729,630 | 3/1988 | Martinez ............................. 350/96.29 |
| 4,861,136 | 8/1989 | Stone et al. ........................... 350/96.3 |
| 5,042,898 | 8/1991 | Morey et al. ............................ 385/37 |
| 5,297,155 | 3/1994 | Pan et al. ................................. 372/20 |
| 5,367,589 | 11/1994 | MacDonald et al. ................... 385/37 |
| 5,602,949 * | 2/1997 | Epworth .................................. 385/37 |
| 5,694,501 | 12/1997 | Alavie et al. ........................... 385/37 |
| 5,699,468 | 12/1997 | Farries et al. ......................... 385/140 |
| 5,841,920 | 11/1998 | Lemaire et al. ......................... 385/37 |
| 5,889,901 * | 3/1999 | Anderson et al. ...................... 385/37 |
| 5,945,666 | 8/1999 | Kersey et al. ................... 250/227.14 |
| 5,991,483 * | 11/1999 | Engelberth ............................... 385/37 |
| 5,999,671 * | 3/1999 | Jin et al. ................................. 385/13 |

OTHER PUBLICATIONS

Xu et al. Electronic Letters, Sep. 26, 1996,. vol. 32, No. 20—Tunable Fiber Bandpass Filter Based on a Linearly Chirped Fibre Bragg Grating for Wavelength Demultiplexing.

Morey et al. SPIE Proceeding Series, Distributed and Multiplexed Fiber Optic Sensors (1991), vol. 1586—Multiplexing Fiber Bragg Grating Sensors.

* cited by examiner

Primary Examiner—Cassandra Spyrou
Assistant Examiner—Jared Treas
(74) Attorney, Agent, or Firm—Townsend and Townsend and Crew LLP; Mark D. Barrish, Esq.

(57) ABSTRACT

A fiber optic package and methods for varying the tension within a fiber Bragg grating or other fiber-based optical device subjects a fiber (having the fiber Bragg grating written therein) to a controlled strain. The resulting strain in the fiber produces a desired and predetermined change in the grating wavelength.

18 Claims, 6 Drawing Sheets

TUNABLE OPTICAL FIBER PACKAGE

BACKGROUND OF THE INVENTION

The present invention is related to the field of fiber optic devices and networks, and in one embodiment provides a mechanism which varies a wavelength response of one or more fiber Bragg gratings by producing a strain in an optical fiber.

Modern fiber optic communication systems often have the ability to simultaneously transfer light signals having differing wavelengths over a single optical fiber.

Fiber Bragg gratings (FBG) are a particularly advantageous structure for differentiating and manipulating optical signals based on their wavelength. Fiber Bragg gratings are often formed by selectively exposing photosensitive fiber to light, thereby creating a permanent refractive-index grating along the core of the fiber. The resulting sharp reflection resonances can be used as demultiplexers, dispersion compensators, and the like. Fiber Bragg gratings also have applications in communications and sensor areas, operating as resonators, filters, pressure sensing elements, etc. Therefore, fiber Bragg gratings are expected to be important components in many optical communication systems, particularly in the dense wavelength division multiplex systems now being developed.

In operation, a grating is written into a fiber to reflect light of a particular wavelength or band of wavelengths, while other wavelengths of light are transmitted through the grating. Each grating is a wavelength-selective reflector having a reflectance response curve with at least one well-defined peak. If the fiber in which the gratings are written is subjected to a strain, the reflectance peak of the grating shifts. Shifts in the wavelength response may result from changes in environmental temperature, mechanical tension, or vibration.

It has been proposed to make use of the variable wavelength response of fiber Bragg gratings to produce novel optical devices. One proposed tunable fiber bandpass filter is achieved by controlling the strain distribution along the length of a linearly chirped fiber Bragg grating by affixing the grating to each element of a piezoelectric stack. This structure can provide complex filter characteristics such as multiple bandpass peaks, comb filtering, and the like. Unfortunately, this proposed structure will also involve a complex controller, and may result in inconsistent filtering if the coupling between the grating and each piezoelectric element is not tightly controlled. As a result, this phase shift structure appears to be quite difficult to fabricate.

In light of the above, there is a significant need for a fiber optic package that provides a new, yet simple and low cost technique for inducing a phase-shift in a fiber Bragg grating. Therefore, a fiber optic package that subjects a fiber Bragg grating to a controlled strain to produce a desired and predetermined change in a grating wavelength is desired.

SUMMARY OF THE INVENTION

The present invention provides a fiber optic package which can cause a change in the center wavelength of a fiber Bragg grating. The package provides a controlled and predetermined change in wavelength response by subjecting a fiber, having a fiber Bragg grating written therein, to a controlled strain. The strain in the fiber Bragg grating causes a wavelength or phase shift of the optical signal, attributable to the controlled optical grating strains.

In some embodiments, a uniform strain in the fiber is induced by varying a longitudinal displacement of a fiber support member supporting the fiber, thereby causing the fiber to stretch. Optionally, the fiber may be fixed at both ends and supported therebetween by the fiber support member. A control actuator is normally used to linearly displace the fiber support member. As the support member is displaced, the fiber is uniformly stretched. By varying the magnitude of the displacement of the fiber support member, and consequently the strain in the fiber, the user can vary the optical characteristics of the package so as to provide the desired optical characteristics throughout a wide range of strain deformation in the fiber.

In one embodiment, an optical fiber package is provided. The package has an optical fiber having at least one grating with an optical characteristic which varies with strain. At least a portion of the optical fiber is received by a fiber support member. The package also includes a control actuator which is coupled to the fiber support member to cause a displacement of the fiber support member. The displacement of the fiber support member creates a uniform strain along the grating.

In yet another embodiment, a tunable optical fiber package is provided which has at least one fiber support member. The fiber support member has a convex surface with a channel formed into the convex surface extending along the convex surface. The package also has an optical fiber which includes optical characteristics which can vary with strain. The optical fiber rides in the channel to correlate changes in the displacement of the fiber support member with changes in the strain of the optical fiber. A control actuator is also provided which has an axis. The displacement of the fiber support member is in the direction of the axis and normal to a portion of the optical fiber in the channel.

Another aspect of the invention relates to a method which includes actuating a control actuator to cause a displacement of a fiber support member, and deforming a span of an optical fiber supported by the fiber support member to induce a uniform strain throughout the span. The optical fiber has an optical characteristic which varies with strain. The strain in the fiber causes a uniform change in a wavelength response of the fiber throughout the span.

In yet another aspect, a method for tuning a fiber Bragg grating package is provided. The method includes introducing an optical fiber into a channel of a fiber support member; and activating a plurality of piezoelectric segments formed into a stack, such that a change in the length of the stack induces an elongation of the control actuator so as to move the fiber support member. The method also includes deforming the optical fiber with the elongation to induce a strain thereby causing a change in a resonant wavelength, such that the resonant wavelength of the fiber is made variable throughout a predetermined range of strain.

In another embodiment, an adjustable optical device is provided which includes an optical fiber having a first portion, a second portion, and a fiber Bragg grating therebetween. The device also includes a first fiber support member, which supports the first portion of the optical fiber; a second fiber support member, which supports the second portion of the optical fiber; and a control actuator, coupled to the first fiber support member and to the second fiber support member. The actuator controllably displaces the first member relative to the second member so as to vary a strain of the fiber such that the strain in the fiber remains substantially uniform between the first portion and the second portion of the fiber.

In yet another aspect, a package for an optical fiber is provided which includes an optical fiber having at least one grating with an optical characteristic which varies with strain. The package also contains a tuning structure for receiving at least a portion of the optical fiber. A control actuator is coupled to the tuning structure and elongates to move at least a portion of the tuning structure. The elongation of the control actuator provides a predetermined correlation between the optical characteristics of the fiber and the elongation.

In yet another embodiment, a variable wavelength optical device is provided which includes an optical fiber having a first end, a second end, and a fiber Bragg grating therebetween. The device also includes a piezoelectric actuator movable throughout an actuator stroke, and a mechanical advantage mechanism coupling the piezoelectric actuator to the optical fiber so that an optical fiber elongation between the first end and the second end is larger than the actuator stroke.

Other features and advantages of the invention will appear from the following description in which the preferred embodiment has been set forth in conjunction with the accompanying drawings.

DESCRIPTION OF THE PREFERRED EMBODIMENT

Stress, as defined herein, is equal to a force applied normal to a specific area. Although the stress can directly cause some optical characteristic variation in the fiber, (due to stress-induced refractive index variation, and the like) its direct effect is usually small compared to the total wavelength shift of the optical signal. The strain, as defined herein, is equal to the deformation of a material when subjected to a force. Typically, strain is induced in a fiber by stretching or compressing (stressing) the fiber material. Strain is responsible for causing the core wavelength shift. For example, the resonant wavelength can vary from an original value by a maximum of between approximately 10 nm to 20 nm throughout a range of strain applied in the optic fiber. The range of strain will result in a relative stretching between about at least 0.1% and 2.0% of a length of a fiber Bragg grating. The elastic properties of optical fibers can vary between fibers from different vendors, so that fibers may perform somewhat differently when under stress.

The present invention has many possible applications in communication systems. The fiber Bragg grating, in particular, plays a very important role in the area of optic communications. For example, by changing or tuning the center wavelength of the fiber Bragg grating in a controlled and predetermined manner, the tuned fiber Bragg grating may be used in a stabilized laser source or else as an add/drop WDM filter.

A change in the center wavelength of a fiber Bragg grating is controlled using a tuning structure. The wavelength ($\lambda$) of the fiber Bragg grating is related to the period ($\Lambda$) of the fiber Bragg grating and the effective index of refraction ($n_{eff}$). The relative period variation of a fiber Bragg grating is equal to the relative length variation of the fiber segment in which a fiber Bragg grating is written. The effective index of refraction is equal to the ratio of the speed of light in a vacuum and the speed of light in a medium. The relationship between these factors is expressed by the equation:

$$\lambda = 2 n_{eff} \Lambda \qquad (1)$$

The wavelength of the fiber Bragg grating can be changed, therefore, by changing the effective index of refraction or by varying the period. Changing the effective index of refraction is a relatively difficult approach to realize, thus, the preferred method of changing the wavelength of a fiber Bragg grating is to vary the period. The period is typically varied by stretching, compressing, or otherwise deforming the fiber. From equation (1) the following equation is derived:

$$\frac{d\lambda}{\lambda} = \frac{dn_{eff}}{n_{eff}} \Lambda + \frac{d\Lambda}{\Lambda} n_{eff} \qquad (2)$$

Thus, if the effective index of refraction is kept constant, the only acting factor in equation (2) is the value of the relative expansion or compression of the fiber Bragg grating period. The variation of the fiber Bragg grating period is proportional to the change in length of the fiber segment in which the fiber Bragg grating is written. For instance, measurements made on Bragg gratings subjected to stretching can have a given frequency shift of approximately 2800 GHz/1% relative-stretching or about 0.0013 nm/g when a standard SMF28 fiber is used. Therefore, the tuning of a fiber Bragg grating can be measured as the relative fiber length variation provided by a tuning structure.

Bragg gratings are known to those skilled in the art, as are methods for writing such gratings. The optical fiber used in the present invention may comprise any suitable optical fiber, but will generally comprise a photo-sensitive fiber commonly used for fabrication of fiber Bragg gratings. Typically, the gratings are written in a fiber using high intensity UV light.

Figure 1:
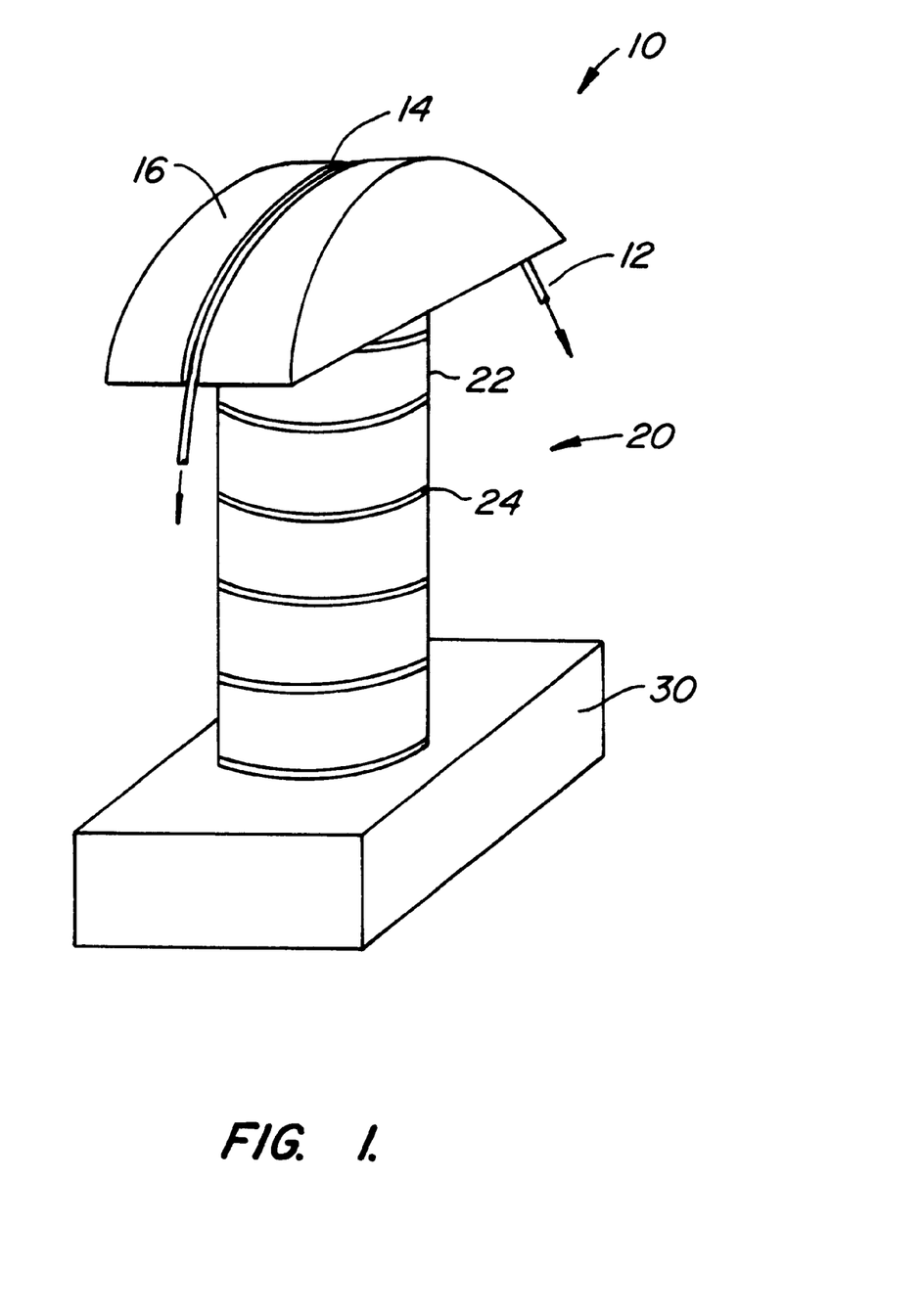
FIG. 1 is a perspective view of a tunable fiber Bragg grating package according to the present invention.

Referring now to FIG. 1, in one embodiment of the present invention, an optical fiber package 10 is shown which can be used to tune the wavelength of an optical fiber having a fiber Bragg grating. Optical fiber package 10, includes an optical fiber 12, which has an optical characteristic that varies with strain. Fiber support member 16 supports optical fiber 12, which is disposed in a channel or guide 14.

Figure 2:
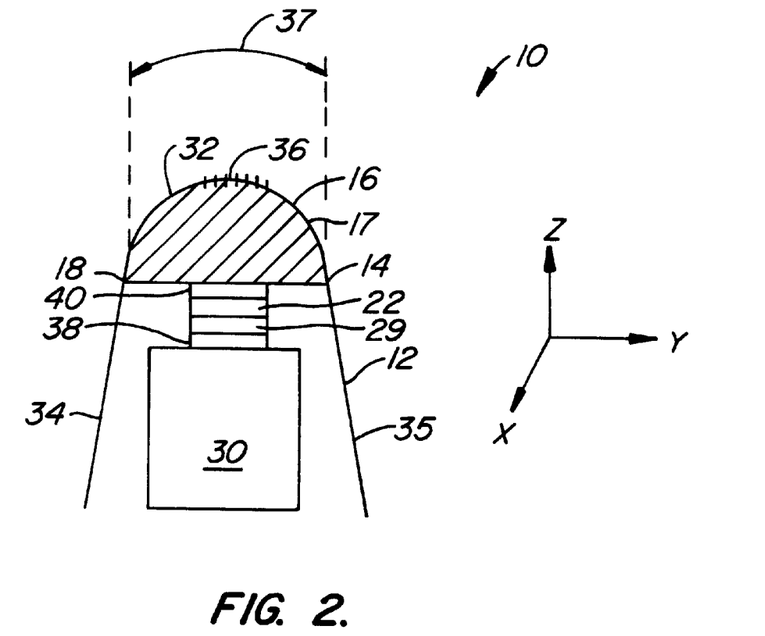
FIG. 2 is a cross-sectional view of the package of FIG. 1, according to the present invention.

As can be understood with reference to the cross-sectional view shown in FIG. 2, optic fiber 12 is separated into three portions: a confined portion 32, which is the span 37 of optic fiber 12 held in channel 14 of support member 16, a first end portion 34, and a second end portion 35. First end portion 34 extends from first edge 18 to a fixed point which may or may not be on substrate 30 (not shown). Second end portion 35 extends from second edge 19 also to a fixed point which may or may not be on substrate 30 (not shown). Fiber 12 can be optionally positioned so that Bragg gratings 36 on fiber 12 (shown schematically) are either located disposed on span 37 of confined portion 32, and/or on first end portion 34, and/or on second end portion 35.

Fiber support member 16 has a convex surface 17 in which channel 14 is formed. Channel 14 extends substantially along convex surface 17 from first edge 18 to second edge 19. Channel 14, and its corresponding inner surfaces, are suitably adapted for slidably receiving span 37 of optic fiber 12. Preferably, the inner surface of channel 14 is substantially smooth to allow even deformation of the fiber. Channel 14 provides a guided conduit for the fiber and may be large enough to fit one or more cross-sections of an optical fiber. Preferably, the channel is 250 microns in width which will accommodate the single mode fiber core, cladding, and external jacket.

Support member 16 can be machined to provide convex surface 17 and channel 14. Alternatively, support member 16 may be cast or molded with channel 14 being formed into support member 16 during the casting or molding process. Support member 16 may be made of a relatively low cost metal such as brass, aluminum, stainless steel, or the like, or alternatively support member 16 may be made of a resilient material, such as plastic.

Figure 3:
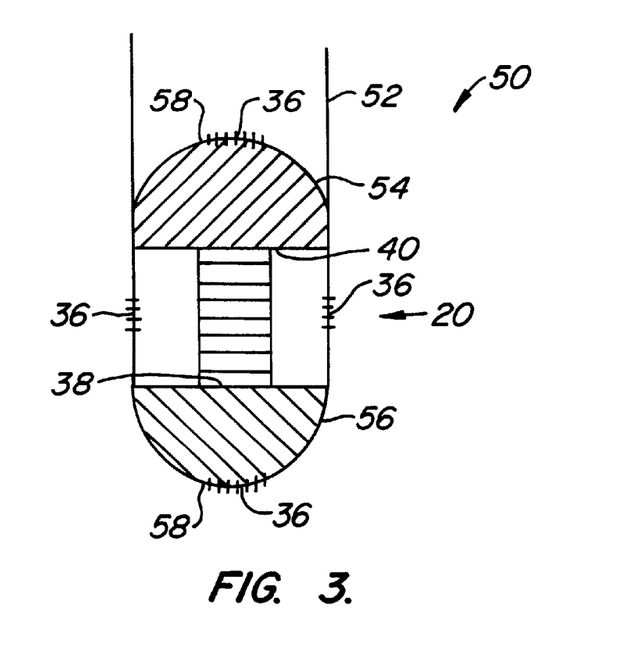
FIG. 3 is a cross-sectional view of an alternative embodiment of the present invention.

As shown in FIG. 3, optical fiber package 10, in an alternative embodiment, can include a second support member 56, which is coupled to the opposing end 38 of control actuator 20. In this embodiment, optical fiber 12 may have multiple fiber Bragg gratings 36 written in the fiber which can be placed under strain simultaneously. Thus, a user can apply an equal strain along multiple fiber gratings.

Advantageously, the strain in optical fiber 12 is uniform throughout the fiber Bragg grating. A constant strain distribution in the fiber allows for precise control of its overall optical characteristics. Since many gratings can be placed under strain at specific locations along a single length of fiber, the even strain distribution ensures that all gratings will experience the same relative amount of strain and a uniform change in their resonant wavelength. Therefore, in some cases, gratings positioned on end portions 34 and 35 of the fiber may undergo the same quantity of strain as the gratings in span 37.

To create the displacement of fiber support member 16, control actuator 20 is coupled to a portion of the fiber support member and made to elongate. Control actuator 20 generally includes a stack of piezoelectric (PZT) segments or cells 22. The stacked PZT control actuator 20 is the preferred mode for causing the linear displacement of fiber support member. Actuator 20 can be designed to meet the needs of a particular application. In one exemplary embodiment, actuator 20 is 5 mm×5 mm×18 mm and is elongated when subjected to a DC voltage. The displacement specification is 15 $\mu$m/150 volts, which corresponds to a relative expansion ability of about $5.56 \times 10^{-6}$/volt. Thus, for example, in a fiber Bragg grating with a center wavelength of 1550 nm, the wavelength tuning ability is approximately 0.0124 nm/volt. An exemplary control actuator 20 is commercially available from Tokin America, Inc. 155 Nicholson Lane, San Jose, Calif., 95134.

In a preferred embodiment of the present invention, the fiber support member includes a magnification structure to increase the tuning range and decrease the voltage applied to control actuator 20. The magnification structure has a considerable mechanical advantage, so that the change in strain in the fiber is much greater than the change in length of the actuator. The magnification structure will typically change the length of the fiber by between about 1 and 20 times the stroke of the actuator. Preferably, the magnification structure will have a mechanical advantage of between about 5 and 15.

Figure 4A:
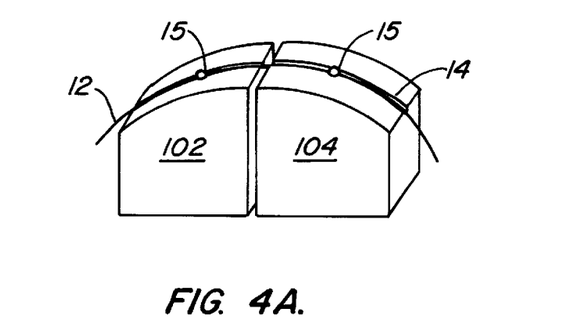
FIGS. 4A–4C are simplified illustrations of a preferred embodiment of the present invention.
Figure 4B:
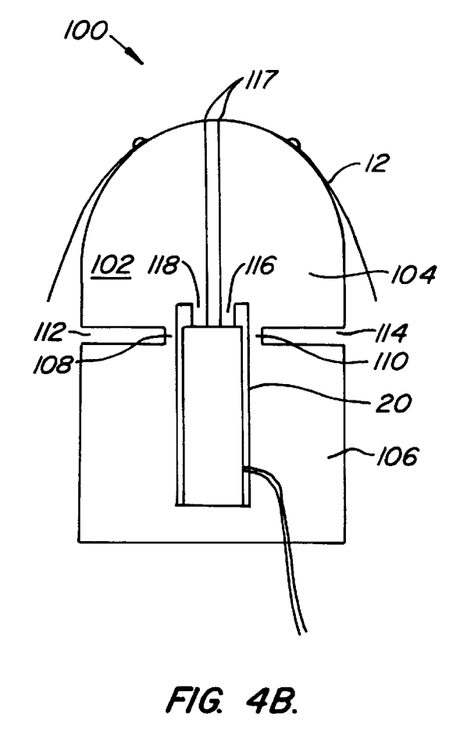
Figure 4C:
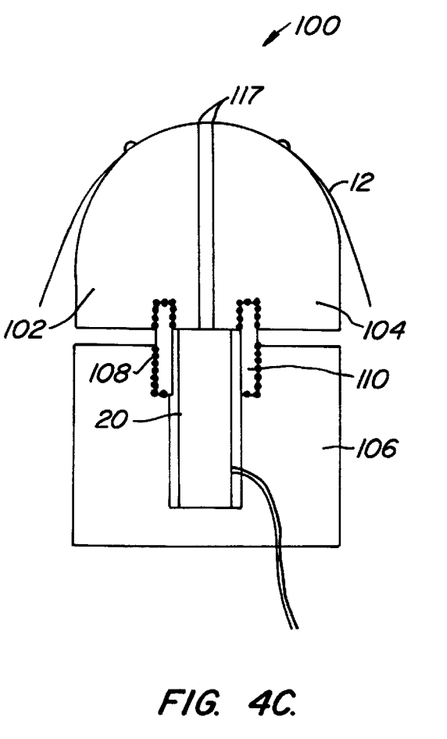

Referring now to FIGS. 4A–4C, the magnification structure includes a first fiber holder 102 and a second fiber holder 104. Control actuator 20 is disposed within base 106 and contacts push points 116 and 118 which can be an integral part of the structures of fiber holders 102 and 104. As before, control actuator 20 causes the displacement of the fiber holders.

As shown in FIG. 4B, first elastic joint 108 couples first fiber holder 102 to base 106, while second elastic joint 110 couples second fiber holder 104 to base 106. Joints 108 and 110 can be an integral part of tuning structure 100. In this embodiment, the joints are formed into the fiber holders and are made of the same material as the magnification structure, typically stainless steel. In an alternative embodiment, as shown in FIG. 4C, elastic joints 108 and 110 can be additionally added elastic members. The joints can be made of any resilient metal, preferably a copper/beryllium (Cu/Be) alloy.

Although, the magnification structure can be sized for any application, in a specific embodiment, the magnification structure is approximately 43 mm in height and approximately 30 mm in width. The structure is about 6 mm thick at base 106, while the fiber holders 102 and 104 are approximately 3 mm thick.

Figure 5A:
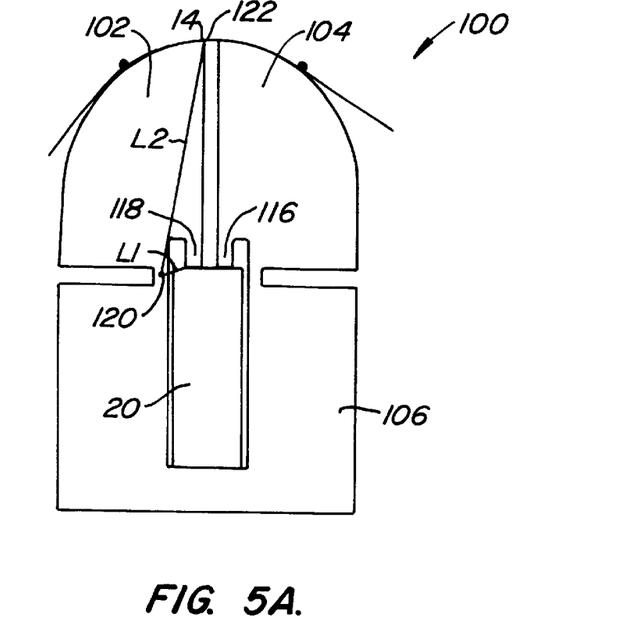
FIGS. 5A and 5B are schematic diagrams of the magnification principle according to the embodiments of FIGS. 4A–4C.
Figure 5B:
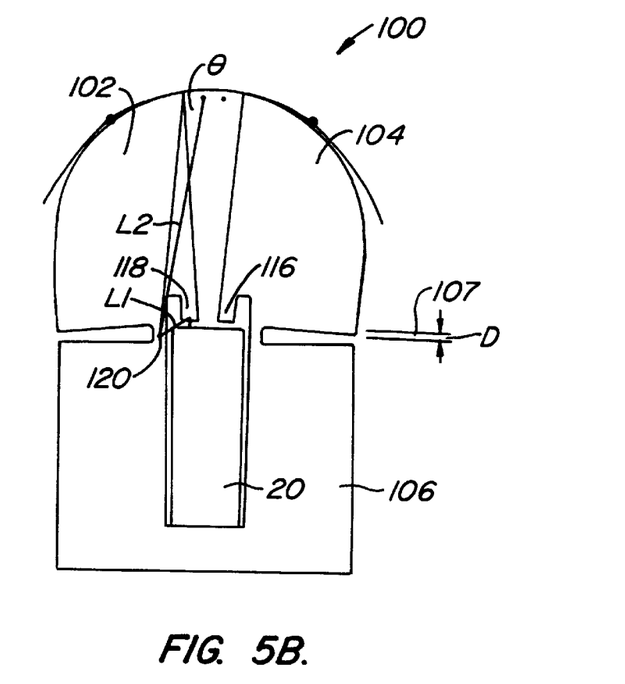
Figure 7:
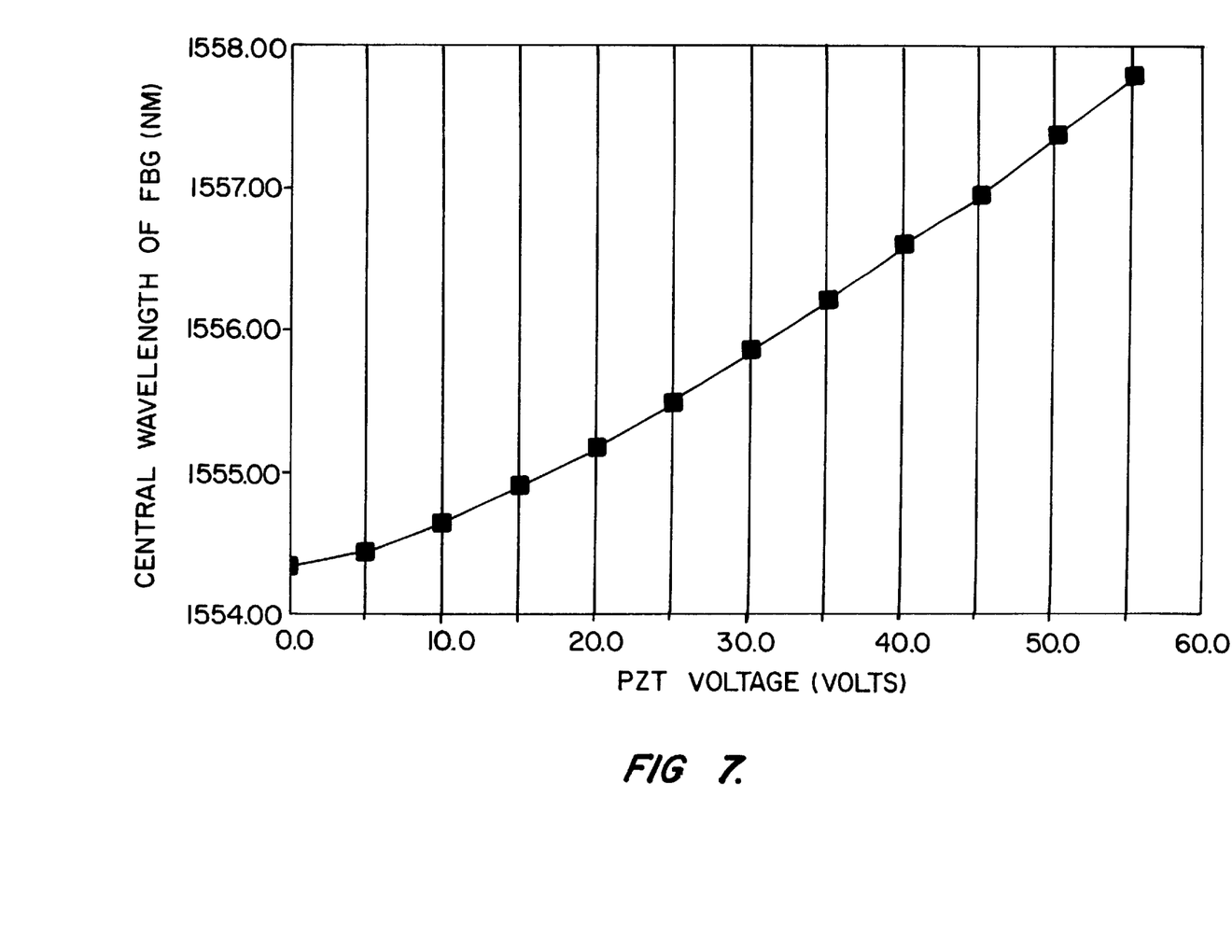
FIG. 7 is a graph of data corresponding to the use of a tuning device with magnification according to the principles of the present invention.

As can be best understood in FIGS. 5A and 5B, the magnification structure is designed to transform the linear elongation D or stroke 107 of actuator 20 into the rotation $\theta$ of fiber holders 102 and 104. For example, in a typical magnification structure, the distance L1 between the axis of rotation 120 and push point 118 is shorter than the distance L2 between the axis of rotation 120 and the edge 122 of guide 14. When actuator 20 is activated it elongates a distance D, also referred to as stroke 107, to linearly drive push points 116 and 118. The force generated in stroke 107, when applied to the magnification structure, causes first and second fiber holders 102 and 104 to rotate an angle $\theta$ about the joints at axis of rotation 120. Given the same angle of rotation, the displacement of the endpoint of distance L2 at edge 122 is much larger than that of the end point of L1 at push points 116 and 118. Thus, the deformation of optic fiber 12 is effectively increased without increasing the stroke 107 or voltage requirement of actuator 20. For example, as illustrated by the graph of FIG. 7, using the magnification structure can substantially increase the shift of the central wavelength relative to the voltage supplied (or stroke 107) to control actuator 20.

Referring again to FIG. 4B, gaps 112 and 114 provide a clearance of approximately 2 mm between fiber holders 102 and 104 and base 106 to facilitate the rotation of the fiber holders. Also, inner corners 117 may be rounded to avoid breaking or damaging the optic fiber during the rotation.

Figure 6A:
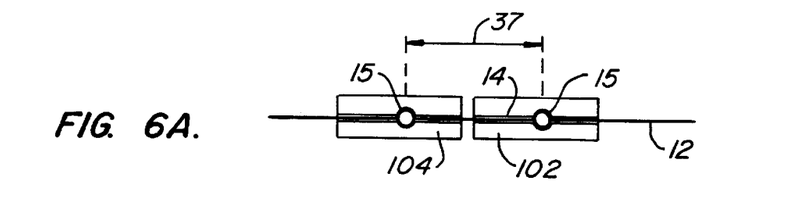
FIGS. 6A–6C are simplified illustrations of an alternative embodiment of the present invention.

As fiber holders 102 and 104 are made to rotate $\theta$, span 37 of the optic fiber 12 held between them is effectively strained. In order for the strain of optic fiber 12 to occur, the span 37 is fixedly held in guide 14. The optic fiber span 37 can be held in a variety of ways. Referring now to FIG. 6A, in a preferred method, epoxy reservoirs 15 are used, which can be formed on portions of guide 14 on each fiber holder 102 and 104. When optic fiber 12 is laid into guide 14, the epoxy holders 15 are filled with an adhesive, preferably an epoxy or the like. The epoxy holds optic fiber 12 in position to receive the stretching force created by the rotating fiber holders. Alternatively, epoxy holders 15 are small posts disposed on fiber holders 102 and 104. The posts effectively hold the optic fiber away from fiber holders 102 and 104 so that the fiber is not restricted from stretching.

Figure 6B:
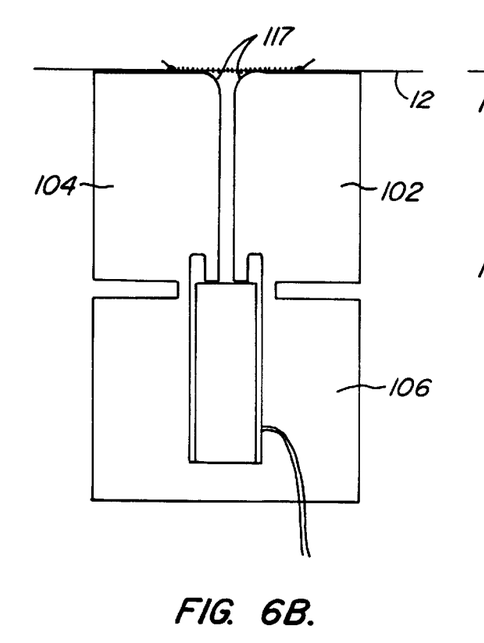
Figure 6C:
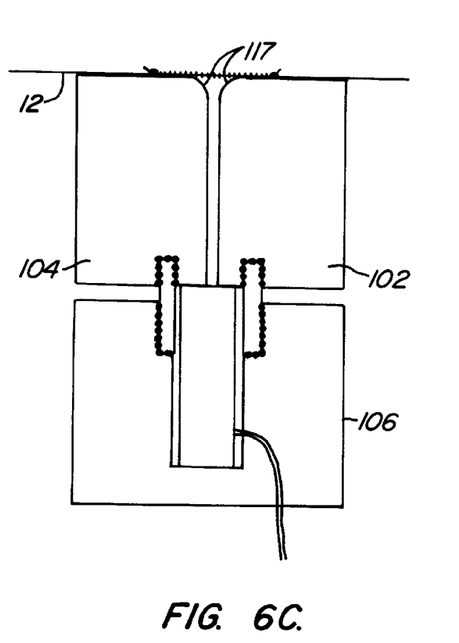

Referring now to FIGS. 6B and 6C, shown are simplified illustrations of an alternative embodiment of the present invention. In this embodiment, the magnification structure performs as described above, however, the shape of fiber holders 102 and 104 is relatively rectangular. Accordingly, the tuning structure can be made of varying shapes and sizes. In using differently shaped fiber holders 102 and 104 the tuning structure can be used in a variety of applications that may be limited in space or which require a specifically shaped structure.

While the exemplary embodiments have been described in some detail, by way of illustration and for clarity of understanding, a variety of modifications, changes, and alternatives will be obvious to those who have skill in the art. Hence, the scope of the present invention is limited solely by the attached claims.

What is claimed is:

1. An optical fiber package comprising:
   an optical fiber portion having at least one grating between a first fiber portion end and a second fiber portion end, the grating having an optical characteristic which varies with strain;
   a fiber support member comprising a base, a first rigid fiber holder body, and a second rigid fiber holder body, the base attached to the first fiber holder at a first joint, the base attached to the second fiber holder at a second joint, the first and second fiber holders coupled to the first and second ends of the optical fiber, respectively; and
   a control actuator having first and second surfaces, actuation of the control actuator displacing the first and second surfaces relative to each other, the first surface engaging the base and the second surface engaging the first and second fiber holders of the fiber support member, the actuation of said control actuator pivotally displacing the first and second fiber holders of the fiber support member about the first and second joints, respectively, such that a uniform strain is created in the optic fiber along the grating.

2. The package as claimed in claim 1, wherein the at least one grating comprises a plurality of fiber Bragg gratings, the optical characteristics comprising a resonant wavelength of the Bragg gratings, a change in strain inducing a change in the resonant wavelength in the fiber, the change in strain within a predetermined range of strain.

3. The package as claimed in claim 2, wherein the range of strain will result in a relative stretching between at least about 0.1% and 1.5% of a length of the fiber Bragg grating.

4. The package as claimed in claim 2, wherein the resonant wavelength varies from an original value to a value between approximately 10 nm to 20 nm throughout the range of strain.

5. The package as claimed in claim 1, wherein the displacement of the fiber support member varies with changes in an elongation of the control actuator to provide a predetermined correlation between the optical characteristics of the fiber and the elongation.

6. The package as claimed in claim 1, wherein the fiber support member defines a convex surface having a fiber guide formed into the convex surface which extends along the convex surface, the guide slidably receiving the optical fiber to couple and correlate changes in the displacement of the fiber support member with uniform changes in the strain of the optical fiber.

7. The package as claimed in claim 1, wherein the control actuator comprises a plurality of piezoelectric segments, each said segment being electrically isolated from one another.

8. The package as claimed in claim 7, wherein a change in strain of the segment induces a change in the displacement of the fiber support member, the change in displacement inducing a strain in the fiber causing a change in resonant wavelength so that the resonant wavelength of the fiber within the package is made uniformly variable throughout a predetermined range of strain.

9. The package as claimed in claim 1, wherein each joint comprises an elastic joint comprising copper/beryllium alloy.

10. The package as claimed in claim 1, wherein each fiber holder comprises a fiber guiding groove for receiving said optical fiber.

11. The package as claimed in claim 1, wherein each of said fiber holders comprises an adhesive reservoir, said reservoir holding an adhesive for coupling said optical fiber to said fiber holders.

12. The package as claimed in claim 1, wherein the fiber support member comprises a magnification structure which transforms a linear displacement of the control actuator into the rotation of each of said fiber holders.

13. The package as claimed in claim 1, wherein the fiber support member comprises stainless steel.

14. An optical fiber package comprising:
    an optical fiber having at least one grating with an optical characteristic which varies with strain;
    a fiber support member receiving at least a portion of the optical fiber;
    a control actuator coupled to the fiber support member, said control actuator displacing the fiber support member such that a uniform strain is created in the optic fiber along the grating; and
    a second fiber support member, the first fiber support member and the second fiber support member each receiving at least a portion of the optical fiber, each coupled to opposing ends of the control actuator, the control actuator inducing a relative displacement between the first fiber support member and the second fiber support member, thereby creating a strain in the optic fiber, wherein the optical fiber is wrapped multiple times around each of said fiber support members.

15. A tunable optical fiber package comprising:
    a plurality of fiber support members, each fiber support member defining a convex surface having a channel formed into the convex surface and extending along the convex surface;
    an optical fiber having an optical characteristic which varies with strain, the optical fiber riding in the channels and affixed to the fiber support members so that a displacement of the fiber support members correlates with changes in the strain of the optical fiber; and
    a control actuator having an actuation axis, the displacement of the fiber support members being effected in response to a signal by actuation of the control actuator along said axis and normal to a portion of said optical fiber in said channel, the displacement of the fiber support member imposing a uniform strain on the fiber such that the strain causes a uniform variation in the optical characteristic of the optic fiber.

16. A method comprising:
    actuating a control actuator with an actuation stroke along an actuation axis in response to a command signal;
    pivotally displacing a fiber support member with the actuation stroke so that the fiber support member moves by a displacement stroke along a displacement axis, the displacement stroke being greater than the actuation stroke;
    deforming a span of an optical fiber with the displacement stroke, while the optical fiber is affixed to said fiber support member, to induce a uniform strain throughout the span, the optical fiber having an optical characteristic which varies with strain; and rollingly engaging the fiber with a rounded surface of the fiber support member to inhibit damage of the fiber when the fiber support member pivots;

wherein the strain in the fiber causes a uniform change in a wavelength response of the fiber throughout the span.

17. The method of claim 16, wherein the control actuator is actuated by activating piezoelectric segments formed into a stack, a change in the length of the stack inducing an elongation of the control actuator so as to move the fiber support member.

18. The method of claim 16, wherein the actuation axis is substantially normal to the displacement axis.

* * * * *